(12) United States Patent
Schapira et al.

(10) Patent No.: US 8,984,144 B2
(45) Date of Patent: Mar. 17, 2015

(54) DELIVERY OF CONTENT

(75) Inventors: Agustin Schapira, Amherst, MA (US); Yiu Leung Lee, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 374 days.

(21) Appl. No.: 13/246,350

(22) Filed: Sep. 27, 2011

(65) Prior Publication Data

US 2012/0226770 A1 Sep. 6, 2012

Related U.S. Application Data

(60) Provisional application No. 61/448,454, filed on Mar. 2, 2011.

(51) Int. Cl.
*G06F 15/16* (2006.01)
*H04L 29/08* (2006.01)

(52) U.S. Cl.
CPC ........ *H04L 67/1021* (2013.01); *H04L 67/2804* (2013.01); *H04L 67/02* (2013.01)
USPC ........................................................ 709/227

(58) Field of Classification Search
CPC .................. H04N 21/47202; H04N 21/6125; H04L 12/189; H04L 63/10; G06F 15/16
USPC .............................. 709/218, 227, 238; 725/98
See application file for complete search history.

(56) References Cited

U.S. PATENT DOCUMENTS

| | | | | |
|---|---|---|---|---|
| 7,680,897 B1* | 3/2010 | Carter et al. | ................... | 709/217 |
| 8,156,243 B2* | 4/2012 | Richardson et al. | .......... | 709/238 |
| 8,260,881 B1* | 9/2012 | Paleja et al. | .................... | 709/218 |
| 8,271,578 B2* | 9/2012 | Sheffi et al. | .................... | 709/203 |
| 8,364,785 B2* | 1/2013 | Plamondon | .................... | 709/219 |
| 8,392,821 B2* | 3/2013 | DeMarco et al. | ............. | 715/230 |
| 8,423,662 B1* | 4/2013 | Weihl et al. | .................... | 709/238 |
| 2007/0250560 A1 | 10/2007 | Wein et al. | | |
| 2007/0265968 A1* | 11/2007 | Kahn et al. | ...................... | 705/51 |
| 2008/0209036 A1* | 8/2008 | Sakamoto et al. | ............. | 709/224 |
| 2008/0222705 A1* | 9/2008 | Goodmon et al. | ................ | 726/4 |
| 2010/0162367 A1* | 6/2010 | LaJoie et al. | ..................... | 726/4 |
| 2010/0251313 A1* | 9/2010 | Mao | ............................... | 725/98 |
| 2011/0197238 A1* | 8/2011 | Li et al. | .......................... | 725/93 |

OTHER PUBLICATIONS

European Search Report EP12157536.9, Mailing date Jun. 27, 2012.
Tavis Hampton, "Creating Scalable Digital Libraries", High Scalability, Jul. 12, 2010, downloaded on Mar. 27, 2012 from <highscalability.com/blog/2010/7/12/creating-scalable-digital-libraries.html>.

(Continued)

*Primary Examiner* — Tesfay Yohannes
(74) *Attorney, Agent, or Firm* — Banner & Witcoff, Ltd.

(57) ABSTRACT

Systems and methods are provided for a pull model for delivery of data such as content metadata among interconnected content delivery networks (CDNi), allowing for accurate metadata information in appropriate edge servers in a large CDNi system. When a request for an asset in a CDN (CDN A) is to be served by another, interconnected CDN (CDN B), a link to the location where the metadata is stored within CDN A can be provided along with the request for CDN B to serve the content to the user. The link can be passed to the appropriate edge device in CDN B, which can retrieve the metadata to set up and support the content session. The encrypted information can also be passed recursively by CDN B to other CDNs with which it is interconnected.

24 Claims, 5 Drawing Sheets

(56) References Cited

OTHER PUBLICATIONS

Multimedia Content Delivery Networks—mCDN, IST Project FP6-507993, Dated Dec. 2004, downloaded on Mar. 27, 2012 from <http://www.comtec.e-technic.uni-kassel.de/content/projects/mcdn/>.

Videonet, "YouView: changing how TV is watched and delivered", Connected TV, Sep. 20, 2010, downloaded on Mar. 27, 2012 from <www.v-net.tv/youview-changing-how-tv-is-watched-and-delivered/>.

Triveni Digital Press Release, "Triveni Digital Announces Content Delivery Network for Advanced Digital Media", Princeton, N.J., Jun. 23, 2010, downloaded on Mar. 27, 2012 from <www.trivenidigital.com/about/2010_06_23.asp>.

Niven-Jenkins Velocix (Alcatel-Lucent) F Le Faucheur Cisco N Bitar Verizon B: "Content Distribution Network Interconnection (CONI) Problem Statement; draft-jenkins-cdni-problem-statement-01.txt", Content Distribution Network Interconnection (CDNI) Problem Statement; draft-jenkins-cdni-problem-statement-01.txt, Internet Engineering Task Force, IETF; Standardworkingdraft, Internet Society (ISOC) 4, Rue Des Falaises CH-1205 Geneva, Switzerland, No. 1, Jan. 17, 2011. pp. 1-33, XP01507355B, [retrieved on Jan. 17, 2011] * sections 1, 4.3 and 4.4 *.

Le Faucheur M Viveganandhan Cisco G Watson Bt Y Lee Comcast F: Content Distribution Network Interconnection (CDNI) Requirements; draft-lefaucheur-cdni-requirements-00.txt, Content Distribution Network Interconnection (CDNI) Requirements; draft-lefaucheur-cdni-requirements-oo.txt, Internet Engineering Task Force, IETF; Standaroworkingdraft, Internet Society (ISOC) 4, Rue Des Falaises CH-1205 Geneva, Switzerland, Jan. 26, 2011. pp. 1-22. XP015073685, [retrieved on Jan. 26, 2011] * sections 1 and 6 *.

Davie B et al: Framework for CDN Interconnection; draft-davie-cdni-framework-OO.txt, Framework for CDN Interconnection; draft-davie-cdni-framework-oo.txt, Internet Engineering Task Force, IETF; Standardworkingdraft, Internet Society (ISOC) 4, Rue Des Falaises CH-1205, Geneva, Switzerland, Jul. 2, 2011, pp. 1-47, XP015076773, [retrieved on Jul. 2, 2011] * section 3.9 *.

* cited by examiner

DELIVERY OF CONTENT

CROSS REFERENCE TO RELATED APPLICATIONS

This application claims priority to provisional application 61/448,454, filed Mar. 2, 2011, titled "Pull Model for Delivery of Metadata Among Interconnected Content Delivery Networks," the contents of which are incorporated herein by reference for all purposes.

BACKGROUND

A content delivery network (CDN) may be a network of servers that delivers pieces of content (e.g., web pages, audio, video, etc.) to end users, typically on behalf of a content provider. A CDN typically disperses its servers across geographically different locations, and copies the media content to each of those distributed servers, where it's stored (cached). When a user requests a particular piece of media content from the content provider that is stored in the CDN, the CDN is capable of redirecting the request to a server in its network that is closer/closest to the user, and that server in turn delivers the content directly from its cache (first retrieving it from the originating server if the cached copy cannot be found). CDNs are effective in speeding the delivery of content of Web sites with high traffic and Web sites that have global reach. The closer the CDN server is to the user geographically, the faster the content is typically delivered to the user. CDNs also provide protection from large surges in traffic. The process of accessing content via a CDN is typically transparent to the user.

Ideally, a CDN should be able to deliver content requested by an end user regardless of the user's geographic location or the service provider through which the user is connected. However, the footprint of the CDN might not reach far enough to reach that user (geographically or in terms of network connectivity), or might not be close enough to the user to gain the benefits (e.g., reduced access latency) that a more distributed CDN could provide. In those cases, a CDN interconnect (CDNi) model becomes desirable, whereby several standalone CDNs collaborate so that their collective footprint can be extended. Typically, CDNi setups have a primary CDN with whom the content provider has a business relationship and which is the main party responsible for handling that Content Provider's traffic. At the same time, the primary CDN also has peer relationships with other CDNs, and whenever it needs their help (e.g., to serve content outside its own footprint) its servers follow agreed-upon protocols that communicate with a secondary CDN's servers and ask them to handle the corresponding requests on their behalf.

In order to securely deliver content to a requesting user or client, a CDN edge server (also referred to as a surrogate) uses content metadata, e.g. information about how the content must be handled. The content metadata may include, e.g., geo-blocking policies, availability windows, links to the source of the content, etc. When a request for a piece of content arrives at the surrogate, the server examines the corresponding metadata and makes a decision about if and how to honor the request. CDN metadata is typically prepositioned statically to the edge surrogates, i.e., the metadata is pushed to each surrogate from a CDN's central unit of control. The surrogate must receive the content metadata before serving a request. This requires the CDN provider to schedule time to update all surrogates before a piece of content can be served. In a CDN-Interconnect (CDNi) environment, where two or more CDNs collaborate with each other to deliver content, the CDNi metadata may be shared across CDNs. However, the preposition/push method becomes unscalable and difficult to manage because there may be too many surrogates to update, and the original CDN might not know how many surrogates the secondary CDN has or where they are. In addition, metadata refresh cycles in the two CDNs might not be synchronized, and the primary CDN may not be able to determine whether the update effort is worth the resource expense with respect to some surrogates, since the original CDN may never ask the second CDN to serve the corresponding content on its behalf.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to systems and methods for a pull model for delivery of metadata content among interconnected content delivery networks (CDNi). Using the pull model described herein, one can maintain accurate metadata information in appropriate edge servers in a large CDNi system. When a request for an asset in a CDN (CDN A) is to be served by another interconnected CDN (CDN B), a link to the location where the metadata is stored within CDN A can be encrypted and provided along with the request for CDN B to serve the asset to the user. The link can be passed to the appropriate edge device in CDN B, which can decrypt the link information and retrieve the metadata to set up and support the content session. The encrypted information can also be passed recursively by CDN B to other CDNs with which it is interconnected, and they can decrypt and use the link to retrieve the metadata from CDN A as well.

According to an illustrative aspect, a first CDN may receive, from a client device, a request for a content item. The first CDN may determine to assign the request for the content item to a second CDN different from the first CDN, and send a query from the first CDN to the second CDN to obtain a location associated with the content item in the second CDN. After receiving a query response from the second CDN, the first CDN sends the location of the content item in the second CDN to the client device. Subsequently, the first CDN receives from the second CDN a request for metadata associated with the content item, and sends the metadata associated with the content item to the second CDN. According to illustrative aspects, the query from the first CDN to the second CDN may include a location of the metadata stored within the first CDN.

According to another illustrative aspect a second CDN may receive from a first CDN a query for a location associated with a content item to be served to a client device by the second CDN. The second CDN may send a query response to the first CDN. The query response may include the location associated with the content item, and may optionally be signed or encrypted. After sending the query response to the first CDN, the second CDN may receive from the client device a request for the content item. Based on the request for the content item, the second CDN may query the first CDN for metadata associated with the content item and determine whether to serve the content item to the client device based on the metadata received from the first CDN. These and other aspects of the disclosure will be described in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
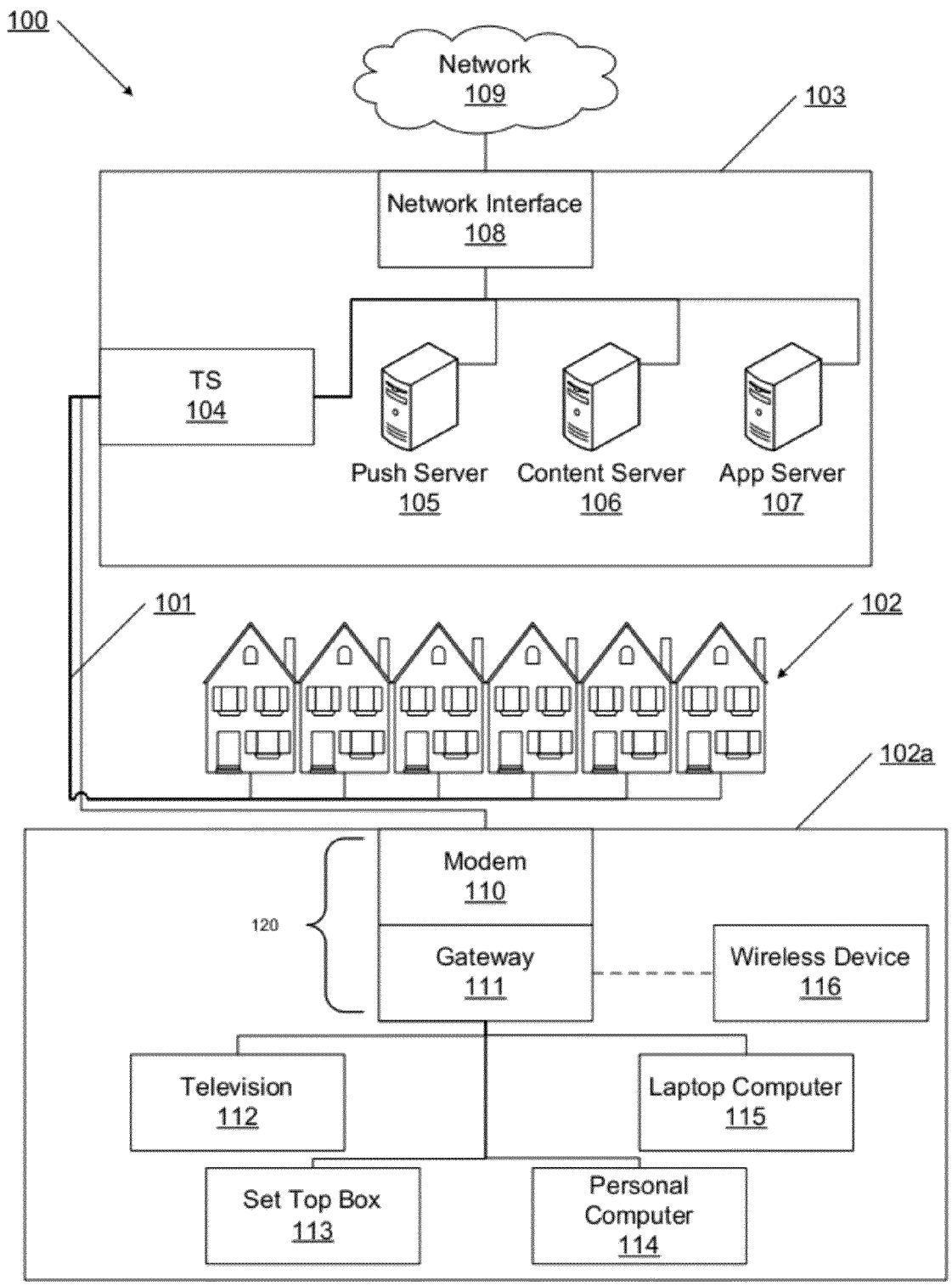
FIG. 1 illustrates an example portion of a content distribution network according to one or more aspects described herein.

FIG. 1 illustrates an example information distribution network 100 in which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths.

The central office 103 may include a termination system (TS) 104, such as a cable modem termination system (CMTS), which may be a computing device configured to manage communications between devices on the network of lines 101 and backend devices such as servers 105-107 (to be discussed further below). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various homes 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. And as will be discussed in greater detail below, another application server may be responsible for enabling chat sessions.

An example premises 102a, such as a home, may include an interface 120. The interface 120 may comprise a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices.

Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
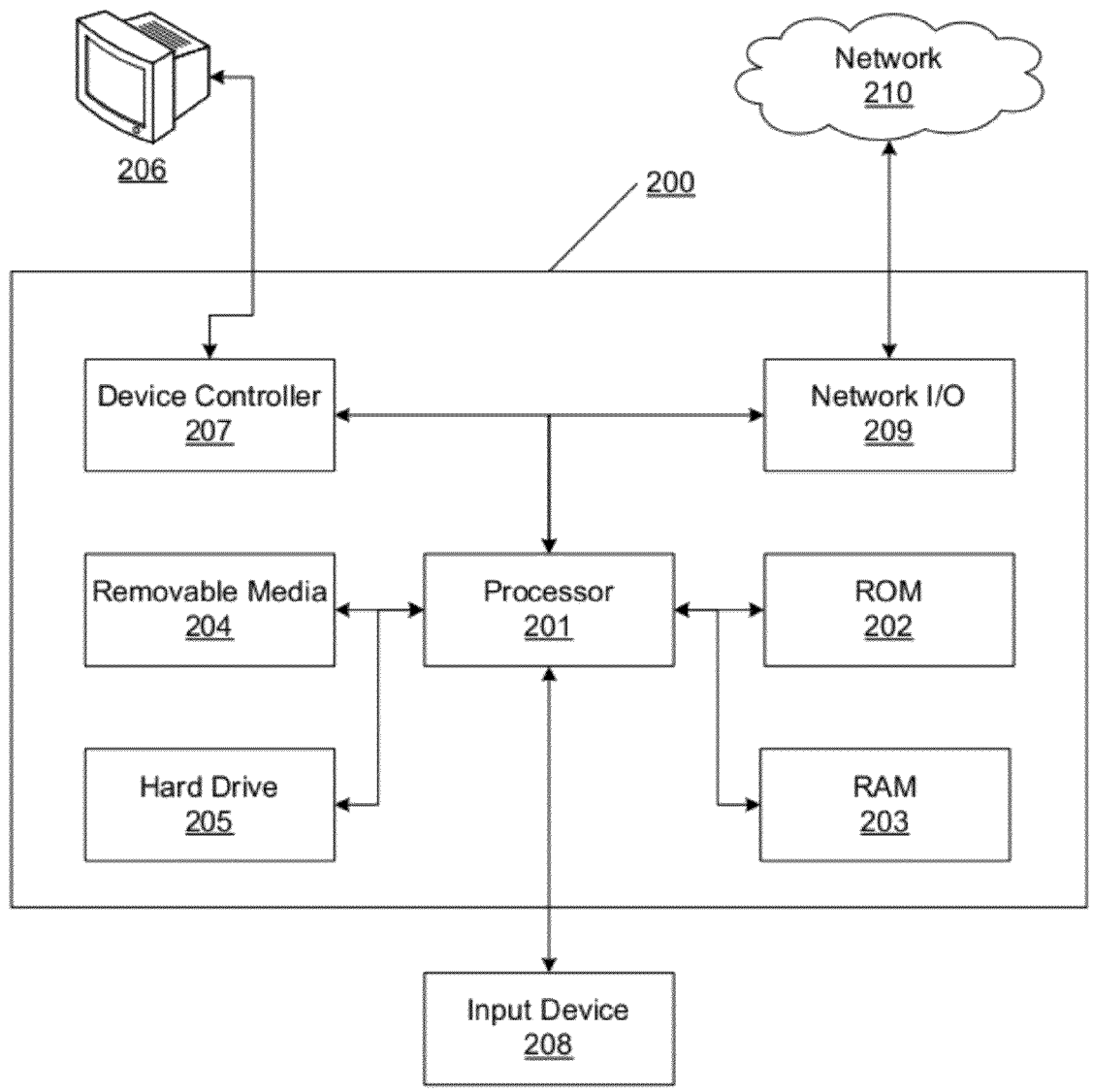
FIG. 2 illustrates an example hardware platform on which the various elements described herein may be implemented according to one or more aspects described herein.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

Figure 3:
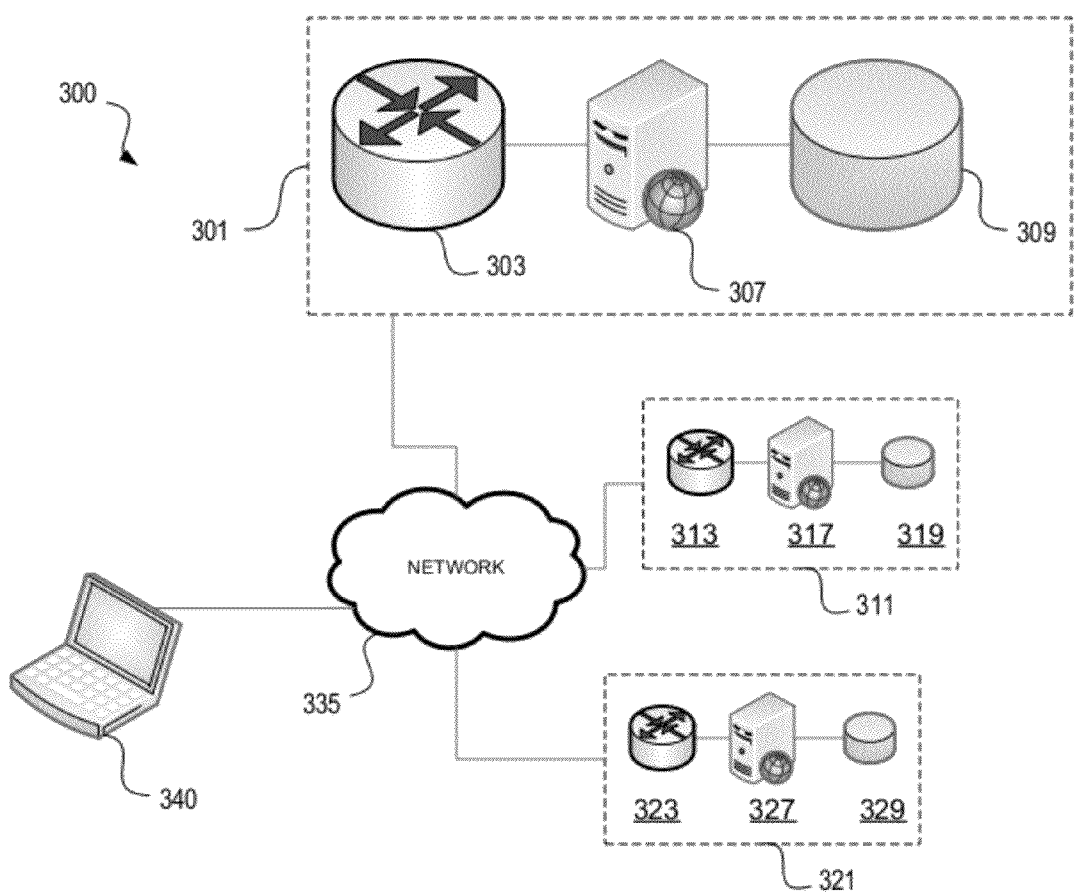
FIG. 3 illustrates a high-level system architecture according to one or more illustrative aspects described herein.

With reference to FIG. 3, some of the various features described herein provide a system architecture 300 to enable a set of CDNs to interoperate. System 300 may include a plurality of content delivery networks (CDN) CDN-A 301, CDN-B 311, and CDN-C 321 interconnected by one or more networks 335. Each CDN 301, 311, 321 may include a routing service (e.g., hosted on a server) 303, 313, 323, whose purpose is to receive requests, e.g., from end users, and route them to the best positioned edge servers within its network. The CDN's may also include a large set of geographically distributed edge servers 307, 317, 327; and a metadata service (e.g., hosted on a server) 309, 319, 329, which may centralize storage of metadata for the content that the CDN manages. A plurality of users may connect to the network, and in turn request content from one or more of the CDNs 301, 311, 321. For illustrative and explanatory purposes, only a single user 340 is depicted in FIG. 3.

System architecture 300 allows for a dynamic, on-demand, pull model for the sharing of CDNi metadata is provided. The pull model described herein, in one aspect, eliminates the need for two or more collaborating CDNs to share (and periodically refresh) their respective CDN metadata repositories (e.g., each entire repository). According to an illustrative aspect, when CDN-A 301 decides that its content would be better served by a second CDN, e.g., CDN-B 311, CDN-A 301 queries CDN-B 311 to determine how to redirect the user, passing a reference to the necessary metadata stored in its metadata service-A 309. CDN-B 311 prepares and returns a new URL, or another type of message, to access a copy of the requested content from its own network, and attaches to the URL a reference to the metadata that CDN-A 301 had provided. CDN-A 301 returns this URL to the end user, who next attempts to access the content from CDN-B 311. An edge server on CDN-B 317 will process the request and extract the reference to the metadata record from the request URL and query the metadata server from CDN-A 309 to retrieve it on-demand or "on the fly". To achieve high scalability and availability, CDN-B 311 may further cache the content metadata within its network (within any limitations set by CDN-A), either at the corresponding edge server or in its own metadata server CDN-B 319. The model described herein may also be used in a recursive fashion, e.g., when CDN-B decides to push the request to a third CDN, e.g., CDN-C 321, and so on.

Figure 4:
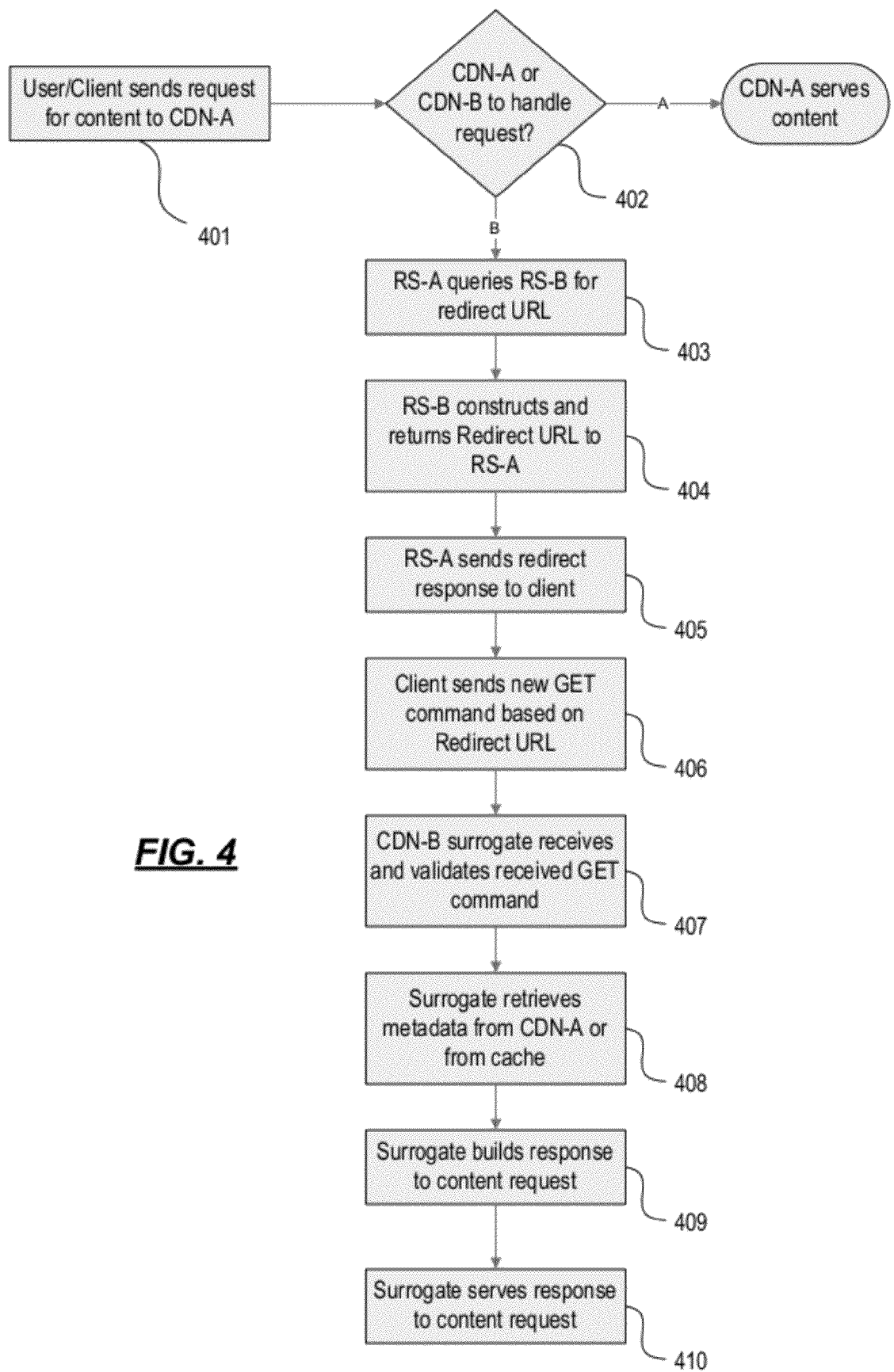
FIG. 4 illustrates a flow chart for a method of a pull model for metadata delivery according to one or more illustrative aspects described herein.

With reference to FIG. 4, an illustrative method for performing a pull model is now described. Initially, in step 401, a user/client sends a request for content to a first CDN, e.g., CDN-A 301, by sending a request that eventually reaches the routing service 303 associated with CDN-A. In step 402, the routing service 303 (RS-A) of CDN-A 301, upon receiving the request, decides whether it can handle the request itself or whether it should invoke a peer (in this example, CDN-B). The decision can be made for any desired reason (e.g., load balancing).

If RS-A determines that CDN-B should serve the content, then in step 403 RS-A contacts a an agreed-upon API (e.g., public or private API) offered by the routing service-B (RS-B) 313 of CDN-B 311, asking RS-B where RS-A should redirect the client 340 so that client 340 in turn retrieves the content from one of CDN-B's servers. The query from RS-A to RS-B may be performed via an HTTP POST command which may pass in its body information regarding the client's request (e.g., client's IP address), and may also include a URL pointing to the CDN metadata stored in metadata server-A 309 that CDN-B may need to handle the request.

In step 404 RS-B 313 constructs a new URL (Redirect URL), referencing a resource within its network that corresponds to the piece of content originally requested by the user from CDN-A, the URL may either be a direct reference to a particular edge server 317 that will serve the content for this particular request, or more generally to the central routing service 313 which would then pick the edge server to handle the request. The Redirect URL may include an element (e.g., an encrypted query parameter) that allows a component of CDN-B (either RS-B 313 itself, or an edge server 317 inside CDN-B) to de-reference the content metadata URL given by RS-A 303. Additionally, the URL may be protected and signed in such a way that only RS-B 313 or edge surrogates 317 of CDN-B can interpret and verify its validity, e.g., via a Hashed Message Authentication Code (HMAC). Once the Redirect URL is ready, RS-B 313 returns it in the body of a response (e.g., OK response) to RS-A 303.

When RS-A 303 receives the HTTP OK response (HTTP status code 200), RS-A 303 extracts the Redirect URL from the body, and uses it in step 405 to in turn redirect the end-user to this new location via an HTTP 302 Redirect response.

The client in step 406 then issues a new GET command to the Redirect URL (which, as described above, points to the copy of the media resource in CDN-B's network). Once CDN-B edge server 317 (acting as a surrogate) receives the end user's request in step 407, it validates the signature in the URL and extracts the metadata URL provided as part of the URL. In step 408 the surrogate 317 follows that URL to download the metadata from CDN-A's metadata server 309 (or finds it already in its cache). After following the rules and policies found in the downloaded metadata, the surrogate 317 in step 409 determines whether to serve or deny the client request, how to build a cache key from the URL, and where to find the content if not already cached. Finally, in step 410, surrogate 317 serves the content to client 340.

According to an alternative aspect, recursion may be used. In the recursive example, CDN-B may decide in turn to pass on the content request to CDN-C. In such a scenario, RS-B first retrieves the CDN metadata provided by RS-A, e.g., in the HTTP POST, and makes it available as its own resource (RS-B may optionally also fetch the actual content from CDN-A). RS-B then repeats a portion of the process illustrated in FIG. 4: it contacts RS-C via another HTTP POST, and passes along the URL to the metadata resource in CDN-B. If RS-C decides to handle the content request, CDN-C builds a Redirect URL with the characteristics described above, and returns the Redirect URL to RS-B, which returns the Redirect URL to RS-A, which returns the Redirect URL to client 340. When user/client issues the next GET or similar command to CDN-C, one of the surrogates of CDN-C verifies the validity of the Redirect URL, retrieves the metadata from CDN-B, and proceeds as usual.

Figure 5:
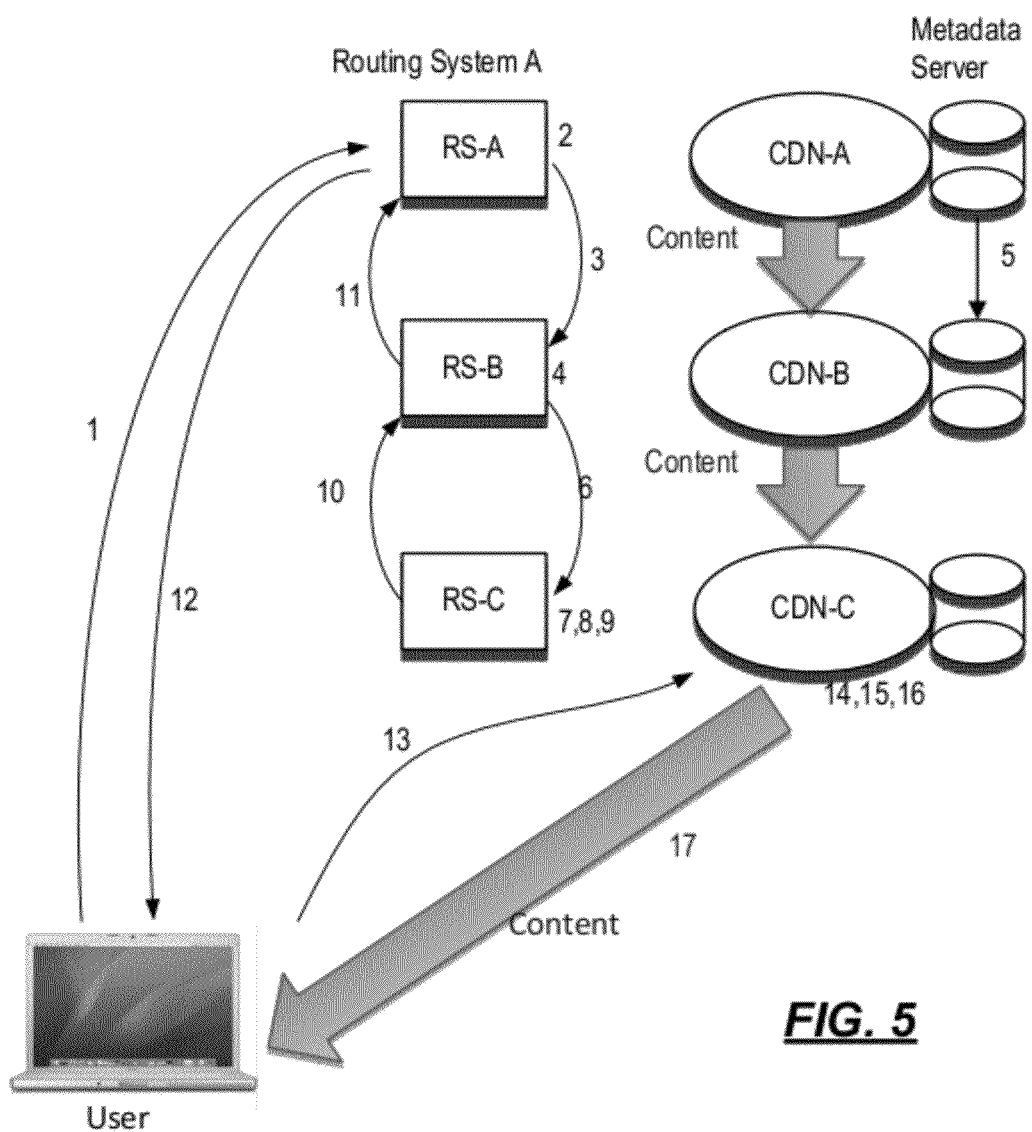
FIG. 5 illustrates data flow according to one or more illustrative aspects described herein.

Additional information and steps performed during a recursive example are now described with reference to FIG. 5. In step 1 a user (e.g., user 340) sends a GET command to CDN-A to retrieve a piece of content. In step 2 RS-A determines to invoke CDN-B to serve the content request. In step 3 RS-A sends the user's IP address and the metadata URL in a first POST message to RS-B. In step 4 RS-B receives the first POST request from RS-A, and determines to ask CDN-C to serve the content request. In step 5 RS-B first extracts the metadata URL from the POST request (from step 4) and downloads the metadata (and optionally the content as well) from CDN-A and stores it in its own metadata server 319. In step 6 RS-B repeats this process with CDN-C by sending, via an HTTP POST request to the routing service in CDN-C 323, the user's location information (e.g., the end user's IP address) and a URL to the copy of the metadata in its own metadata service 319.

RS-C receives the second POST message in step 7 and determines that CDN-C will serve the content request. In step 8 RS-C constructs the new Redirect URL following the guidelines above, and in step 9 RS-C signs the URL with signatures that its own CDN-C servers may verify. Finally, in step 10, CDN-C returns the new Redirect URL to CDN-B, in the HTTP 200 OK response.

In step 11 RS-B sends its own HTTP 200 OK response to RS-A, with the URL it received from CDN-C. RS-A retrieves the URL in the HTTP 200 OK response's body and in step 12 sends the URL to client 340 as its HTTP 302 Redirect response to the original end user's request.

In step 13 client 340 sends a second GET to CDN-C's edge server 327. In step 14 CDN-C edge server 327 validates the signature of the request and extracts the metadata URL. In step 15 CDN-C follows the metadata reference provided in the URL and downloads the metadata from CDN-B's metadata server 319) In step 16 CDN-C edge server 327 examines the data in the metadata and decides if it should serve or deny the client request. In step 17, CDN-C delivers the content (or a denial of content) to client 340.

The method steps described herein are illustrative in nature, and may be altered according to various aspects. Method steps may be combined, split into more minute steps, omitted, or altered in order so long as the resulting functionality provides the same result.

Using the above described systems and methods for a pull model for delivery of metadata among interconnected content delivery networks, one can maintain accurate metadata information in appropriate edge servers in an interconnected content delivery network (CDNi). As described above, if a request for an asset in a CDN (CDN A) would be better served by another, interconnected CDN (CDN B), a link to the location where the metadata is stored within CDN A can be encrypted and provided along with the request for CDN B to serve the asset to the user. The link can be passed to the appropriate edge device in CDN B, which can decrypt the link information and retrieve the metadata to set up and support the content session. The encrypted information can also be passed recursively by CDN B to other CDNs with which it is interconnected, and they can decrypt and use the link to retrieve the metadata from CDN A as well.

Other alternatives may be used as well. For example, instead of or in addition to the architecture shown in FIG. 5, a first CDN (e.g., CDN-A) may inform a servicing CDN (e.g., CDN-C) to obtain metadata directly from the Content Provider using similar messaging between CDNs as is described above, so that neither the initial CDN (CDN-A) nor any intermediary CDN (e.g., CDN-B) are required to maintain a copy of the metadata. It will thus be appreciated and understood that modifications may be made without departing from the true spirit and scope of the present disclosure. The description is thus to be regarded as illustrative instead of restrictive on the present disclosure.

What is claimed is:

1. A method comprising:
   receiving from a client device, by a first content delivery network (CDN), a first request for a content item, wherein the first request is received over a data network;
   determining, by a computing device associated with the first CDN, to forward the first request for the content item to a second CDN different from the first CDN;
   sending a query from the first CDN to a determined application programming interface (API) of the second CDN to obtain a location associated with the content item in the second CDN;
   after receiving a query response from the second CDN, sending the location of the content item in the second CDN to the client device;
   receiving at the first CDN, from the second CDN, a request for metadata associated with the content item; and
   sending the metadata associated with the content item to the second CDN.

2. The method of claim 1, wherein the determined application programming interface (API) is published by a routing service of the second CDN.

3. The method of claim 1, wherein sending the query comprises sending an HTTP POST message.

4. The method of claim 3, wherein the HTTP POST message includes an internet protocol (IP) address of the client device and an address of the metadata within the first CDN.

5. The method of claim 1, wherein the query response further comprises a signature usable to interpret and verify a validity of the query response.

6. The method of claim 1, wherein the query response is sent in an HTTP OK message.

7. The method of claim 1, wherein sending the location of the content item in the second CDN to the client device comprises sending an HTTP Redirect message to the client device.

8. The method of claim 1, wherein forwarding the first request for the content item to a second CDN different from the first CDN comprises assigning the first request to the second CDN.

9. One or more non-transitory computer readable storage media storing instructions that, when executed by a processor, cause a data processing system within a first content delivery network (CDN) to perform:
   receiving from a client device a first request for a content item, wherein the first request is sent over a data network;
   determining to forward the first request for the content item to a second CDN different from the first CDN;

sending a query from the first CDN to a determined application programming interface (API) of the second CDN to obtain a location associated with the content item in the second CDN;

after receiving a query response from the second CDN, sending the location of the content item in the second CDN to the client device;

receiving from the second CDN, a request for metadata associated with the content item; and sending the metadata associated with the content item to the second CDN.

10. The non-transitory computer readable storage media of claim 9, wherein the determined application programming interface (API) is published by a routing service of the second CDN.

11. The non-transitory computer readable storage media of claim 9, wherein sending the query comprises sending an HTTP POST message.

12. The non-transitory computer readable storage media of claim 11, wherein the HTTP POST message includes an internet protocol (IP) address of the client device and an address of the metadata within the first CDN.

13. The non-transitory computer readable storage media of claim 9, wherein the query response further comprises a signature usable to interpret and verify a validity of the query response.

14. The non-transitory computer readable storage media of claim 9, wherein the query response is sent in an HTTP OK message.

15. The non-transitory computer readable storage media of claim 9, wherein sending the location of the content item in the second CDN to the client device comprises sending an HTTP Redirect message to the client device.

16. The non-transitory computer readable storage media of claim 9, wherein forwarding the first request for the content item to a second CDN different from the first CDN comprises assigning the first request to the second CDN.

17. A method comprising:
receiving from a first content delivery network (CDN), at a second CDN different from the first CDN, a query for a location associated with a content item to be sent to a client device by the second CDN;

sending a query response from the second CDN to the first CDN, the query response comprising the location associated with the content item in the second CDN and comprising a signature usable to verify a validity of the query response;

after sending the query response, receiving at the second CDN, from the client device, a request for the content item;

based on the request for the content item, querying the first CDN for metadata associated with the content item; and determining whether to send the content item to the client device based on the metadata received from the first CDN.

18. The method of claim 17, wherein the query is received in the form of an HTTP POST command comprising an internet protocol (IP) address of the client device and an address of the metadata.

19. The method of claim 17, wherein the query response comprises a signature usable to interpret and verify a validity of the query response, and wherein the request for the content item comprises the signature.

20. The method of claim 1, wherein the query comprises a link to a location where the metadata is stored in the first CDN, and wherein the request for metadata received at the first CDN from the second CDN is based on the link.

21. The method of claim 20, further comprising the second CDN determining to forward the request for the content item to a third CDN; and the second CDN passing the link to the third CDN.

22. The method of claim 20, further comprising the second CDN dereferencing the link to obtain the metadata.

23. The non-transitory computer readable storage media of claim 9, wherein the query comprises a link to a location where the metadata is stored in the first CDN, and wherein the request for metadata received at the first CDN from the second CDN is based on the link.

24. The non-transitory computer readable storage media of claim 23, further comprising the second CDN dereferencing the link to obtain the metadata.

* * * * *